Dec. 14, 1965  E. T. YOUNG  3,223,123
MULTIFUNCTION VALVE FOR CHROMATOGRAPHY
Filed May 27, 1963  3 Sheets-Sheet 1
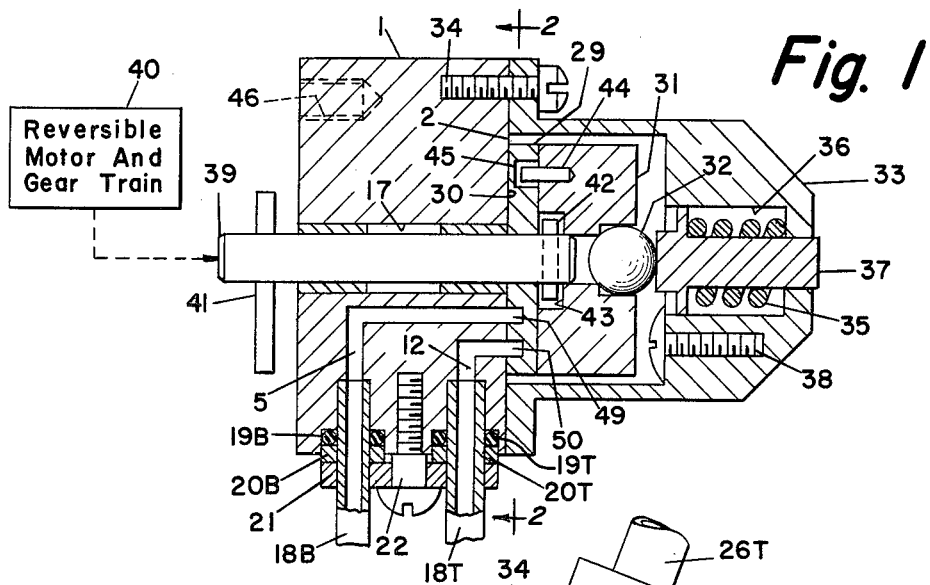
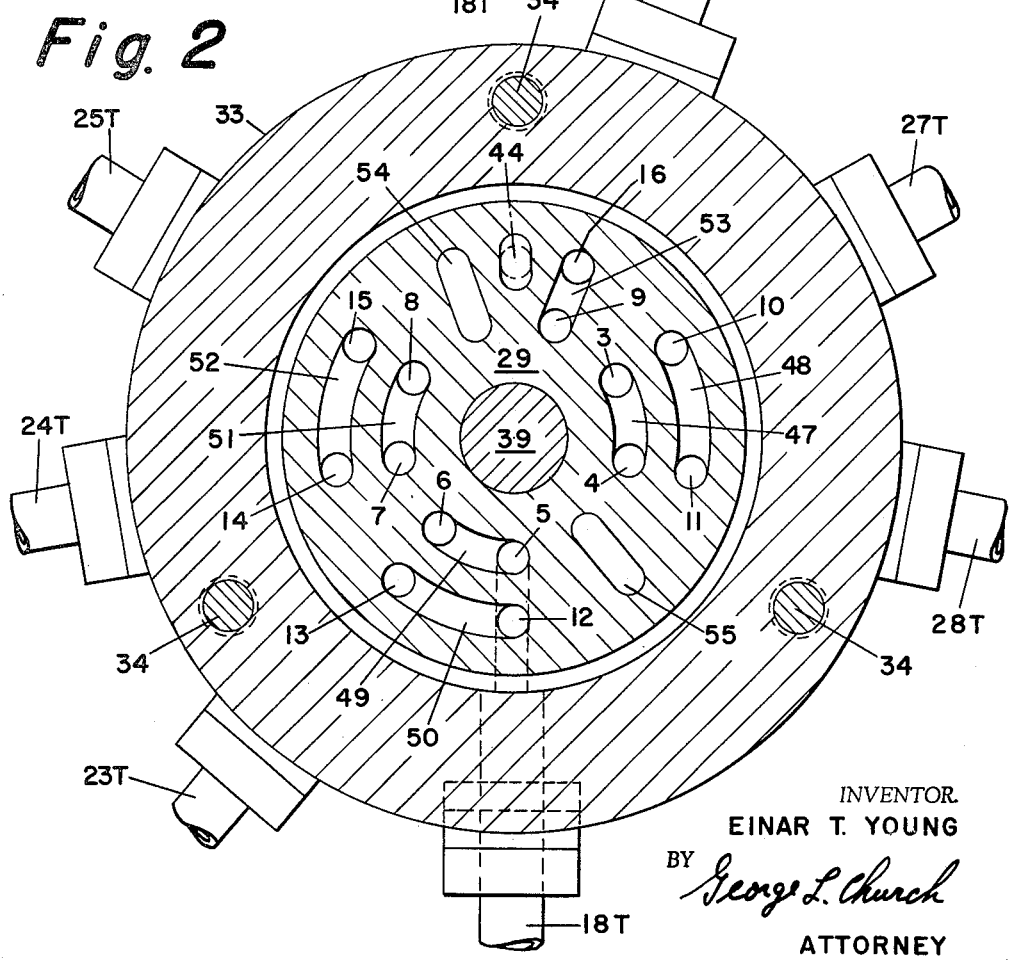
INVENTOR.
EINAR T. YOUNG
BY George L. Church
ATTORNEY Dec. 14, 1965　　　　E. T. YOUNG　　　　3,223,123
MULTIFUNCTION VALVE FOR CHROMATOGRAPHY
Filed May 27, 1963　　　　3 Sheets-Sheet 2

INVENTOR.
EINAR T. YOUNG
BY George L. Church
ATTORNEY

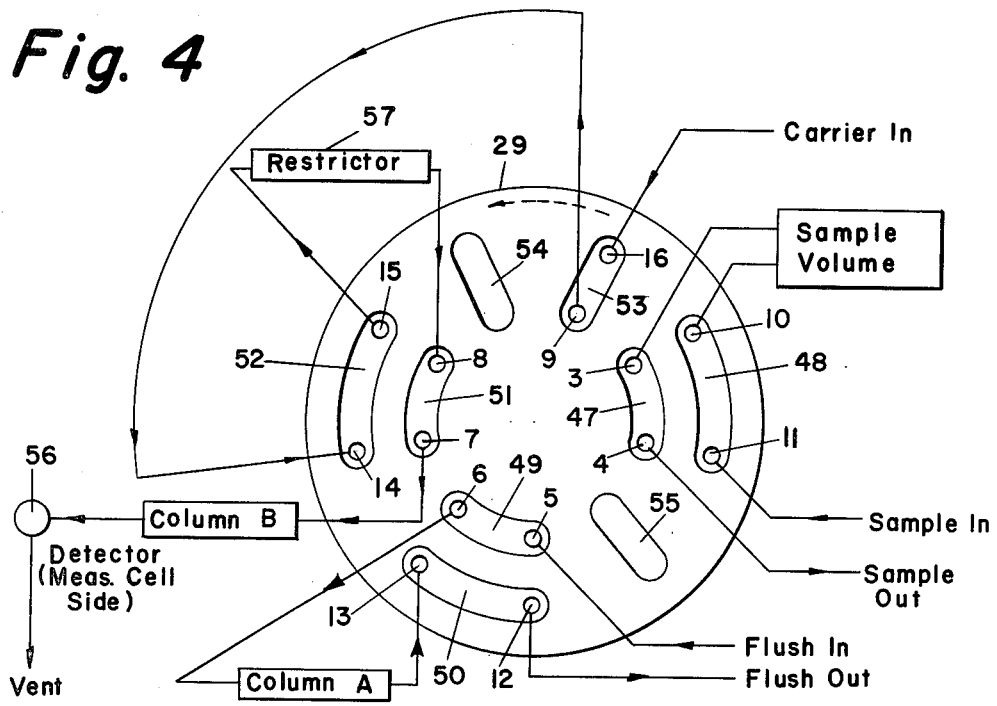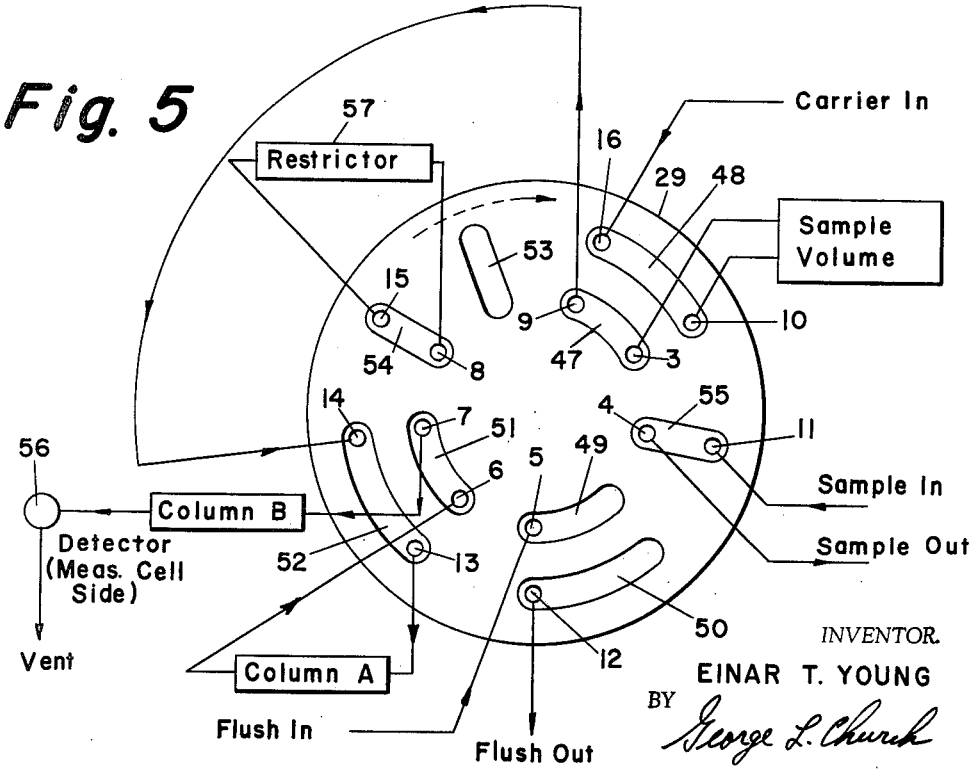

United States Patent Office

3,223,123
Patented Dec. 14, 1965

3,223,123
MULTIFUNCTION VALVE FOR
CHROMATOGRAPHY
Einar T. Young, Newtown Square, Pa., assignor to Sun
Oil Company, Philadelphia, Pa., a corporation of New
Jersey
Filed May 27, 1963, Ser. No. 283,425
3 Claims. (Cl. 137—625.46)

This invention relates to apparatus for transferring to a main fluid stream a quantity of fluid from an auxiliary fluid stream, and more particularly to an improved valve construction for intermittently injecting into a continuously flowing main fluid stream a predetermined volume of fluid (i.e., a sample) from an auxiliary fluid (or sample) stream. Valves of the type aforesaid, known as fluid sampling or sample injecting valves, are commonly utilized in connection with gas chromatography, for injecting or introducing fluid samples into a sweep or carrier gas stream, prior to the partitioning column of the chromatograph. The same valve may perform another important function, in addition to the function of introducing a measured quantity of sample to the column, and this other or additional function may be column switching, when the chromatograph includes two separation columns. The valve employs a single, common moving element for performing both of these last-mentioned functions.

For directing the flow of various fluids as required in chromatography, several different designs of valves have been used. In one design, the valve operates by sliding linearly. This "linear" valve involves high frictional forces, and thus requires a large operating force.

In another valve design, the valve operates by rotating one polished surface with respect to another polished surface, to thereby change the port connections. This "rotary" type of valve involves much smaller frictional forces than the "linear" type of valve previously mentioned, and is also simpler in design and easier and less expensive to manufacture. However, previous "rotary" valves have been of limited usefulness, in that the only function they can perform is simply the introduction of sample into a single partitioning or separation column.

In some separations (e.g., the analysis of the light fraction of gasoline mixtures, or the analysis of crude oil for light hydrocarbons), the use of a single column as previously mentioned has disadvantages. In these cases, resort is desirably had to the use of two columns. The first column then acts as a preliminary fractionating column to separate the light fraction, and the second column provides a complete analysis of this fraction; the heavier components retained in the first column are prevented from interfering with the light components in subsequent runs by backflushing the first column with a flushing gas while the second chromatographic separation of the light fraction (in the second column) is in progress. Such use of two columns requires that the columns be switched, at intervals which are coordinated with the introduction of samples into the device; for proper operation of chromatographic apparatus of this type (in an automatic, repetitive fashion) it is highly desirable, if not absolutely essential, that both the column switching and sample introduction functions be performed by the same device or mechanism. "Rotary" type valves for performing both functions have not, to the best of my knowledge, been previously available.

An object of this invention is to provide a novel "rotary" type valve for chromatographs.

Another object is to provide a "rotary" type valve for chromatographs which can perform both a sample introduction function and a column switching function, in an independent manner and without any interference one with the other.

A further object is to accomplish the foregoing objects in an efficient manner, such that only a relatively small force is required to operate the valve from one of its two positions to the other.

The objects of this invention are accomplished, briefly, in the following manner: A generally cylindrical valve body has therein a plurality (e.g., fourteen) of fluid passages which terminate at their inner ends in an array on a circular end face of the body. The fourteen passage inner terminations are arrayed in two concentric circles, and are further arranged in two groups, the first group comprising six passage terminations (which are used for sample introduction) and the second group comprising eight passage terminations (which are used for column switching). A disc member is positioned in engagement with the body end face and is mounted for rotation with respect to such face. This disc member has a plurality of shallow channels therein adjacent the body end face, these channels being arranged in two groups corresponding respectively to the two groups of passage inner terminations and each channel coupling together a particular pair of the fluid passages within its corresponding group, the particular pair of passages so coupled together depending upon the rotational position of the disc with respect to the body end face. The disc is rotated with respect to the body end face in order to change the internal fluid connections afforded by the valve. There are both radially-extending (to couple together two passages in the same group, but on different ones of the two concentric circles) and arcuate (to couple together two passages in the same group, on the same circle) channels, in each of the two groups of channels on the disc. A separate fluid flow conduit is coupled to the other terminus of each of the fourteen fluid passages, to enable connection of the valve into a chromatograph.

A detailed description of the invention follows, taken in conjunction with the accompanying drawings, wherein:

FIG. 1 is a vertical section through a valve according to this invention;

FIG. 2 is a section taken along line 2—2 of FIG. 1;

Figure 6:
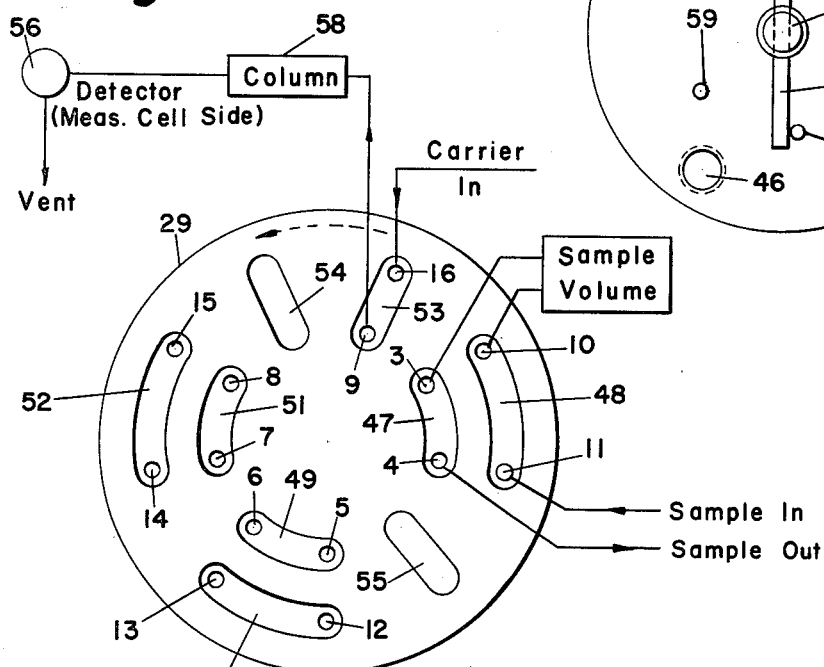
Figure 7:
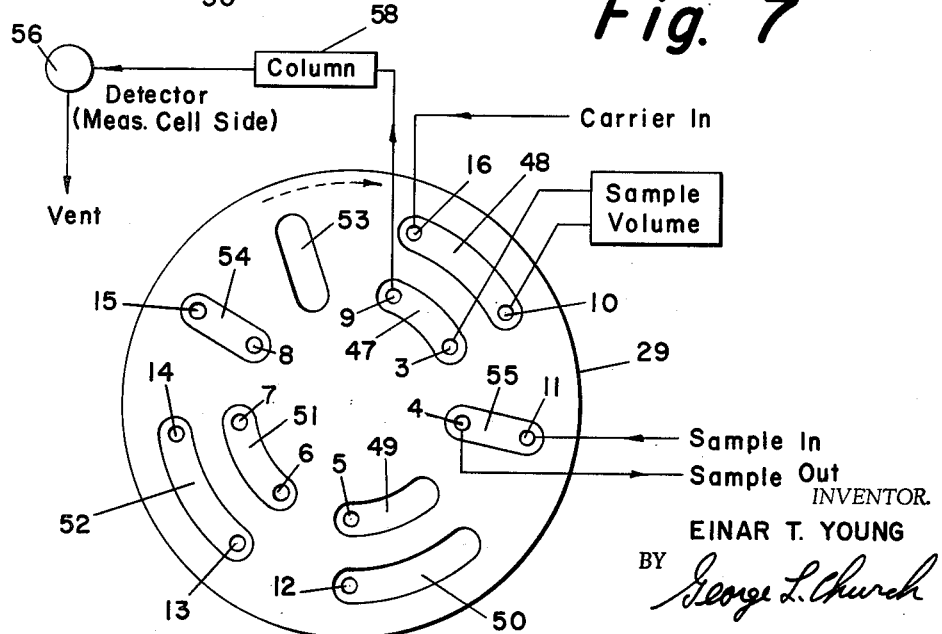

FIGS. 4 and 5 are schematic plumbing diagrams illustrating the two respective positions of the valve, in a two-column backflush chromatograph; and FIGS. 6 and 7 are diagrams similar to FIGS. 4 and 5 but illustrating the valve in a one-column chromatograph.

Refer now to FIGS. 1 and 2. A generally cylindrical valve body 1 has a circular planar end face 2 which is polished smooth and flat. Body 1 has therein fourteen fluid passages, numbered 3 through 16 inclusive, which terminate at their inner ends in an array on end face 2. Speaking generally, these inner terminations are located at spaced points arranged in two concentric circles, the center of these circles lying on the axis of a central longitudinal bore 17 (see FIG. 1) which extends through body 1. The inner terminations of passages 3 through 9 lie on the inner of the two circles, while the inner terminations of passages 10 through 16 lie on the outer circle. There are an equal number of passage inner terminations on each of the two circles, and such terminations are radially paired. That is to say, the inner terminations of passages 3 and 10 are in radial alignment, the inner terminations of passages 4 and 11 are in radial alignment, the inner terminations of passages 5 and 12 are in radial alignment, and so on.

The passage inner terminations are distributed or spaced non-uniformly around each of the two circles previously mentioned, in such a way as to divide them into two groups, the inner terminations of passages 3, 4, 9, 10, 11, and 16 forming a first group and the inner terminations of passages 5, 6, 7, 8, 12, 13, 14, and 15 forming the second group. In order to form such groups, the arcuate distance between adjacent passage inner terminations within each single group (for example, the arcuate distance between the inner terminations of the passages 3 and 4, the arcuate distance between the inner terminations of the passages 10 and 11, the arcuate distance between the inner terminations of the passages 5 and 6, the arcuate distance between the inner terminations of the passages 14 and 15, etc.) is less than the arcuate distance between the end termination of one group and the adjacent end termination of the other group (that is, the arcuate distance between the inner terminations of the passages 4 and 5, the arcuate distance between the inner terminations of the passages 11 and 12, the arcuate distance between the inner terminations of the passages 8 and 9, or the arcuate distance between the inner terminations of the passages 15 and 16). If in FIG. 2 one imagines a "center line" drawn at an angle of 45° to the vertical and extending from the upper left to the lower right (which would be "Northwest-Southeast" in conventional map terminology), it may be seen that the six passage inner terminations constituting the first group (to wit, the inner terminations of passages 3, 4, 9, 10, 11, and 16) all lie on one side of this "center line," while the eight passage inner terminations constituting the second group (to wit, the inner terminations of passages 5, 6, 7, 8, 12, 13, 14, and 15) all lie on the other side of this "center line."

From its inner termination at end face 2, each of the fluid passages in body 1 extends in a direction parallel to the longitudinal axis of the body, then makes a 90° turn to terminate (at its outer end) at the cylindrical wall of body 1, as shown in FIG. 1. The termini at the cylindrical wall of body 1 are arranged in two circular decks corresponding respectively to the two concentric circles previously mentioned. That is to say, these latter terminations are located at spaced points arranged in two circular decks extending around the cylindrical wall of body 1. Passages 3 through 9 terminate in one deck (which may, for convenience, be termed the lower or bottom deck), and passages 10 through 16 terminate in the other deck (termed the upper or top deck). The reasons for such "upper" and "lower" terminology will be appreciated when it is realized that, in use, the valve of this invention is ordinarily positioned so that face 2 is horizontal and at the upper end of the valve body. The terminations at the cylindrical wall of body 1 are aligned in pairs. That is, the outer terminations of passages 3 and 10 are aligned in a direction parallel to the longitudinal axis of body 1, the outer terminations of passages 4 and 11 are aligned in a direction longitudinally of body 1, the outer terminations of passages 5 and 12 are aligned in a direction longitudinally of body 1 (see FIG. 1), and so on.

Fluid flow connections to the valve body are made through ⅛-inch O.D. tubing, or fluid flow conduit, there being a separate conduit for each of the fourteen fluid passages. The conduits are inserted in the valve body 1, and sealed therein by small O-rings which are compressed in pairs, each pair compressed by a separate screw and yoke arrangement. Thus, as shown in FIG. 1, the conduits or tubes 18T (for top) and 18B (for bottom) are held in place and sealed by means of separate small O-rings 19T and 19B, which are compressed by the respective gland rings 20T and 20B, under the urging of a clamp or yoke 21 which is forced toward body 1 by means of a screw 22 which threads into a tapped hole in body 1. A similar combination of two seal rings, two gland rings, and a screw and yoke is utilized for each pair of conduits. The seven top or upper conduits are denoted by numerals 18T, 23T, 24T, 25T, 26T, 27T, and 28T in FIG. 2; it will be appreciated that the seven B or bottom conduits are aligned with the respective top conduits so cannot be seen in FIG. 2. It may be appreciated, however, that the following couplings are provided: conduit 18T to passage 12, conduit 18B to passage 5, conduit 23T to passage 13, conduit 23B to passage 6, conduit 24T to passage 14, conduit 24B to passage 7, conduit 25T to passage 15, conduit 25B to passage 8, conduit 26T to passage 16, conduit 26B to passage 9, conduit 27T to passage 10, conduit 27B to passage 3, conduit 28T to passage 11, and conduit 28B to passage 4.

The division of the passages into two groups, as previously described, may be further appreciated from a consideration of the locations of the conduits in FIG. 2. Thus, conduits 26T, 27T, and 28T (plus, of course, the respective paired "bottom" conduits) are located on one side of the cylindrical valve body, and together with their associated passages form one group; conduits 18T, 23T, 24T, and 25T (plus, of course, the respective paired "bottom" conduits) are located on the other side of the cylindrical valve body, and together with their associated passages form the other group.

A generally cylindrical disc member 29 has one circular face 30 polished smooth and flat, and member 29 is positioned so that this face 30 is in engagement with the valve body end face 2. Disc 29 is held in sealed relation with the main valve body 1 by means which will now be described. A pressure plate 31, of generally cylindrical configuration and having a diameter equal to that of disc 29, overlies and engages this disc. A hardened steel ball 32 is positioned in a centrally-located recess provided at the top (right-hand side in FIG. 1) of plate 31, so that the ball can transmit a force downwardly (or to the left in FIG. 1) against plate 31 and disc 29. A domed cover 33 holds the valve assembly together and keeps out dust. This cover is held securely against end face 2 of body 1 by means of three screws 34 which pass freely through the cover and thread into tapped holes in body 1. A powerful compression spring 35 is positioned within an interior chamber 36 provided in cover 33. One end of this spring bears against cover 33 at the end of chamber 36, and the opposite end of the spring bears against an integral flange near the head of a plunger 37 whose shank is slidably mounted in cover 33. The inner end or head of plunger 37, in turn, bears against ball 32 and thus urges this ball downwardly, or to the left in FIG. 1, away from cover 33.

When the device is assembled, the spring 35 in cover 33 exerts a pressure of about 400 p.s.i. to seal the disc 29 against the body end face 2. The pressure of this spring, of course, is exerted on disc 29 (to thereby hold this disc in contact with body 1) by way of plunger 37, ball 32, and plate 31. Three screws 38, which thread into downwardly-opening tapped holes in the bottom of cover 33 and whose heads project radially inwardly of the wall of chamber 36, prevent the loss of plunger 37 and spring 35 when cover 33 is removed. Thus, spring 35 is held captive within cover 33.

Figure 3:
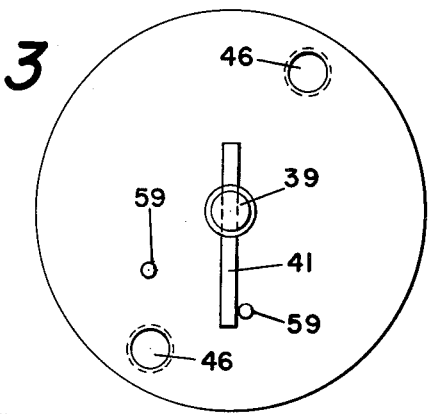
FIG. 3 is an elevational view, looking at the drive shaft end of the valve.

Disc 29, while being held in sealed contact with body face 2, is mounted for rotation with respect thereto. A drive shaft 39 is journaled for rotation in bore 17 of body 1, the center line of the shaft coinciding with the axis of the bore. Shaft 39 is rotated back and forth between two pre-established rotational positions (about 40° apart) by means of a reversible motor and gear train unit 40 (shown schematically in FIG. 1), which is mechanically coupled to the outer end of shaft 39. A drive pin 41, which is fixedly secured to the outer or exposed end of shaft 39 and which extends transversely with respect to this shaft, cooperates with a pair of stop pins 59 (which are secured to body 1 and which extend outwardly from the bottom end face of this body, in the path of pin 41) to limit the rotation of shaft 39 to an angular displacement of about 40°. See FIG. 3.

Near the opposite or inner end of shaft 39, a pin 42 extends through drive shaft 39 in a transverse direction, and this pin engages the sides of a recess 43 provided in the lower or inner side of plate 31, to rotate this plate through an angle of about 40° as shaft 39 rotates. The rotational force is transmitted to disc 29 by means of a pin 44 which is secured to plate 31 and which engages the sides of a radially-elongated recess 45 provided in the upper or outer side of disc 29. Thus, as drive shaft 39 is rotated back and forth between two pre-established rotational positions about 40° apart (as limited by pin 41 and stop pins 59), disc 29 is driven back and forth through the same angle, by way of pin 42, plate 31, and pin 44.

By means of a pair of tapped holes 46 provided in the lower end of body 1 (see FIG. 3), a suitable mounting plate (not shown), for mounting the valve on a fixed support, may be screwed to the valve body.

In the face 30 of disc 29, there are provided a plurality of shallow channels which are each arranged to couple together a particular pair of the fluid passages which terminate at face 2, the particular pair of passages coupled together by each channel depending upon the rotational position of disc 29 with respect to face 2. Various configurations of channels can be cut in disc 29, for various purposes. One purpose, for chromatography, uses in various ways the configuration shown and now to be described.

One of the shallow channels in face 30 of disc 29 is an arcuate channel 47 (the center of the arc being on the axis of rotation of disc 29, that is, on the center line of drive shaft 39) which, in the disc position illustrated in FIG. 2, couples together passages 3 and 4. Arcuate channel 47 has a length sufficient to extend between two adjacent passage terminations on a single one of the two concentric circles previously mentioned (to wit, the inner circle). Another shallow channel in face 30 of disc 29 is an arcuate channel 48 (having the same center as channel 47) which, in the FIG. 2 disc position, couples together passages 10 and 11. Arcuate channel 48 has a length sufficient to extend between two adjacent passage terminations on a single one of the two concentric circles previously mentioned (to wit, the outer circle). Other shallow arcuate channels in face 30 of disc 29 are: arcuate channel 49, similar to arcuate channel 47 and coupling together passages 5 and 6 in the disc position of FIG. 2; arcuate channel 50, similar to arcuate channel 48 and coupling together passages 12 and 13 in the disc position of FIG. 2; arcuate channel 51, similar to arcuate channel 47 and coupling together passages 7 and 8 in the disc position of FIG. 2; and arcuate channel 52, similar to arcuate channel 48 and coupling together passages 14 and 15 in the disc position of FIG. 2.

In addition to the shallow arcuate channels described, there are several shallow radial channels in face 30 of disc 29. One of these latter is a radial channel 53 which, in the disc position illustrated in FIG. 2, couples together passages 9 and 16. Radial channel 53 has a length sufficient to extend between the two concentric circles previously mentioned, so as to couple together the two radially-aligned passage terminations 9 and 16, each of which is on a respective one of the two concentric circles. Other shallow radial channels in face 30 of disc 29 are: radial channel 54, similar to radial channel 53 and adapted to couple together passages 8 and 15; and radial channel 55, similar to radial channel 53 and adapted to couple together passages 4 and 11.

FIGS. 4 and 5 are schematic plumbing diagrams illustrating the use of the valve of this invention for a typical two-column backflush arrangement. Such a two-column chromatograph is used where the stream contains heavy components which are not measured. FIGS. 4 and 5 are views showing the channels in the disc 29 and the ends of the passages in the valve body, looking at the disc in the same direction as in FIG. 2. FIG. 4 illustrates the clockwise position of the disc 29, the "normal" or "unoperated" position; it may be seen that this position is the same as that illustrated in FIG. 2. FIG. 5 illustrates the counterclockwise position of the disc 29, the "sample injecting" or "operated" position. The dotted arrow in FIG. 4 indicates the counterclockwise direction in which the disc rotates to reach the other pre-established rotational position (to wit, the position of FIG. 5), about 40° away from the FIG. 4 position; the dotted arrow in FIG. 5 indicates the clockwise direction in which the disc rotates to reach the other pre-established rotational position (to wit, the position of FIG. 4).

As previously explained, the fourteen fluid passages are divided into or arranged in two groups, with the six passages on one side of the valve body (to wit, passages 3, 4, 9, 10, 11, and 16) constituting one group, and the eight passages on the other side of the valve body (to wit, passages 5, 6, 7, 8, 12, 13, 14, and 15) constituting the other group. The shallow channels in face 30 of disc 29 are arranged in two respective associated groups. This may be appreciated from a consideration of FIGS. 4 and 5.

The first group of disc channels (associated with the six passages 3, 4, 9, 10, 11, and 16 of the first passage group) is made up of arcuate channels 47 and 48, and radial channels 53 and 55. Arcuate channel 47 couples together passages 3 and 4 in the FIG. 4 valve position, and passages 3 and 9 in the FIG. 5 position. Arcuate channel 48 couples together passages 10 and 11 in the FIG. 4 position, and passages 10 and 16 in the FIG. 5 position. Radial channel 53 couples together passages 9 and 16 in the FIG. 4 position, and is not used in the FIG. 5 position. Radial channel 55 is not used in the FIG. 4 position, and couples together passages 4 and 11 in the FIG. 5 position.

The second group of disc channels (associated with the eight passages 5, 6, 7, 8, 12, 13, 14, and 15 of the second passage group) is made up of arcuate channels 49, 50, 51, and 52, and radial channel 54. Arcuate channel 49 couples together passages 5 and 6 in the FIG. 4 valve position, and dead-ends passage 5 in the FIG. 5 position. Arcuate channel 50 couples together passages 12 and 13 in the FIG. 4 position, and dead-ends passage 12 in the FIG. 5 position. Arcuate channel 51 couples together passages 7 and 8 in the FIG. 4 position, and couples together passages 6 and 7 in the FIG. 5 position. Arcuate channel 52 couples together passages 14 and 15 in the FIG. 4 position, and couples together passages 13 and 14 in the FIG. 5 position. Radial channel 54 is not used in the FIG. 4 position, and couples together passages 8 and 15 in the FIG. 5 position.

It may be seen that the two disc channel groups, like the two passage groups, are independent of each other. That is to say, disc channels 47, 48, 53, and 55 are used only in connection with the first group of six body passages (to wit, passages 3, 4, 9–11, and 16), while disc channels 49–52 and 54 are used only in connection with the second group of eight body passages (to wit, passages 5–8 and 12–15).

For a two-column backflush chromatograph, the six body passages of the above-mentioned first group are used to introduce a measured quantity of sample to the primary partitioning or separation column of the chromatograph, while the eight body passages of the above-mentioned second group are used for column switching.

For a two-column backflush arrangement, certain plumbing (fluid flow) connections are made to the valve. For the first group of six body passages, a supply of carrier or sweep gas (usually helium) is connected to conduit 26T, and through this conduit to passage 16, this being the "carrier in" connection for the valve; one end of a measured "sample volume" is connected to conduit 27T, and through this conduit to passage 10; the other end of the sample volume is connected to conduit 27B, and through this conduit to passage 3; the sample supply line is connected to conduit 28T, and through this conduit to passage 11, this being the "sample in" connection for the valve; and the "sample out" connection (e.g., sample vent) is made to conduit 28B, and to passage 4 associated therewith. For the second group of eight body passages, a supply of flush gas (e.g., a second stream of carrier gas) is connected to conduit 18B, and through this conduit to passage 5, this being the "flush in" connection for the valve; the "flush out" connection (e.g., flush vent) is made to conduit 18T, and to passage 12 associated therewith; one end of partition or separation column A is connected to conduit 23T, and through this conduit to passage 13; the other end of column A is connected to conduit 23B, and through this conduit to passage 6; one end of partition or separation column B is connected to conduit 24B, and through this conduit to passage 7; the other end of column B is connected to the measuring cell side of a thermal conductivity detector 56, and through this measuring cell to a vent; conduit 24T (and thus passage 14) is connected directly to conduit 26B (and thus to passage 9 in the first group of body passages); one end of a restrictor 57 is connected to conduit 25T, and through this conduit to passage 15; the other end of restrictor 57 is connected to conduit 25B, and through this conduit to passage 8.

The restrictor 57 is chosen to have the same resistance to carrier flow as column A.

In the "normal" or "unoperated" valve disc position of FIG. 4, carrier gas flows successively through body passage 16, disc channel 53, passage 9, passage 14, channel 52, passage 15, restrictor 57, passage 8, channel 51, passage 7, column B, the measuring cell side of detector 56, and out the vent. A flushing stream flows successively through body passage 5, disc channel 49, passage 6, column A (from left to right), passage 13, channel 50, passage 12, and out. A sample flows successively through body passage 11, disc channel 48, passage 10, the sample measuring volume, passage 3, channel 47, passage 4, and out. There is no mixing of these various streams in the valve.

When an analysis of the sample is desired, a programming device operates the motor and gear train unit 40 (FIG. 1), which rotates the disc member 29 counterclockwise (i.e., in the direction of the dotted arrow in FIG. 4) about 40° to the "sample injecting" or "operated" position of FIG. 5.

In the "sample injecting" or "operated" position of FIG. 5, the carrier gas flows successively through body passage 16, disc channel 48, passage 10, the sample volume, passage 3, channel 47, passage 9, passage 14, channel 52, passage 13, column A (from right to left), passage 6, channel 51, passage 7, column B, the measuring cell side of detector 56, and out; the carrier gas thus sweeps the sample from the sample volume and carries it into column A and column B. The analysis is now carried out in the detector 56 after the columns A and B have separated the components of the sample, in chromatographic fashion. This will be further referred to hereinafter. In the valve disc position of FIG. 5, the flushing stream is blocked at the valve disc, and the sample flows unimpeded in and out of the valve (as is necessary) by way of body passage 11, disc channel 55, and passage 4.

After a certain time in the FIG. 5 (counterclockwise) valve position, when the light components of the sample are in column B and the heavy, unwanted components are in column A, the valve is driven (under the control of the programming device) to the clockwise position of FIG. 4. Then, the carrier gas flows (as previously described) through the restrictor 57, column B, and the detector 56, where the light components (as separated by column B) are measured. At the same time, the flush gas flows (as previously described) through column A backwards or in the reverse direction, and removes the heavy components from this column. As previously described, the flush stream does not flow while the valve is in the counterclockwise position of FIG. 5.

Leaks which develop in the valve of this invention can usually be corrected by replacing the valve disc 29. This is quickly and easily done by removing the valve cover 33. The three cover screws 34 should be loosened together, so that the action of spring 35 will not put too much strain on any one screw. After the cover 33 is removed, the pressure plate 31 is lifted off and the pin 42 is removed. Then the disc 29 can be slipped off over the drive shaft 39, and a new disc can be put into place.

As has previously been described, in FIGS. 4 and 5 the six body passages constituting the first group of such passages, on one side of the valve body, are used to introduce a measured quantity of sample into the first or primary separation column, column A, and the eight body passages constituting the second group of such passages, on the other side of the valve body, are used for column switching. These two groups of body passages operate essentially independently of each other, the only connection between them being the external conduit which connects the outer termini of passages 9 and 14. Insofar as the valve itself is concerned, these two groups of body passages are entirely independent of each other and have their own sets of disc channels (as previously described). In fact, this independence of the two groups of body passages is such that it is very possible to use the valve of this invention in a simpler one-column chromatograph; therefore, the valve is quite versatile and readily adaptable to modified apparatus. In the case of the one-column chromatograph, only the six sample introducing passages (to wit, passages 3, 4, 9, 10, 11, and 16) are used. The one-column chromatograph use of the valve will now be described, with reference to FIGS. 6 and 7.

FIGS. 6 and 7 are schematic plumbing diagrams (similar in some respects to FIGS. 4 and 5, respectively) illustrating the use of the valve of this invention for a one-column chromatograph. FIG. 6 illustrates the clockwise position of the disc 29, the "normal" or "unoperated" position, while FIG. 7 illustrates the counterclockwise position of the disc 29, the "sample injecting" or "operated" position.

For a single-column arrangement, the following plumbing (fluid flow) connections are made to the valve: a supply of carrier gas is connected to conduit 26T, and through this conduit to passage 16; one end of a measured "sample volume" is connected to conduit 27T, and through this conduit to passage 10; the other end of the sample volume is connected to conduit 27B, and through this conduit to passage 3; the sample supply line is connected to conduit 28T, and through this conduit to passage 11; the "sample out" connection is made to conduit 28B, and to passage 4 associated therewith; one end of the partition or separation column 58 is connected to conduit 26B, and through this conduit to passage 9; and the other end of column 58 is connected to the measuring cell side of a thermal conductivity detector 56, and through this measuring cell to a vent.

In the "normal" or "unoperated" valve disc position of FIG. 6, the carrier gas flows successively through body passage 16, disc channel 53, passage 9, column 58, the measuring cell side of detector 56, and out the vent. At the same time, the sample flows successively through body passage 11, disc channel 48, passage 10, the sample measuring volume, passage 3, channel 47, passage 4, and out.

When an analysis of the sample is desired, the programming device operates to trigger rotation of disc member 29 counterclockwise about 40° to the "sample injecting" or "operated" position of FIG. 7. Then, the carrier gas enters body passage 16 and flows through disc channel 48 to passage 10, where it leaves the valve and flows through the sample volume. Here it picks up the trapped sample, returns to the valve at passage 3, then flows through the channel 47 to passage 9, and out to the column 58. The analysis is now carried out in the detector 56 after column 58 has separated the components of the sample, in standard chromatographic fashion. At the same time, the sample flows in at body passage 11, thence through disc channel 55 and passage 4 to "sample out."

It may be noted that in the one-column chromatograph plumbing arrangement depicted in FIGS. 6 and 7, only the six passages on the sampling side of the valve (to wit, passages 3, 4, 9, 10, 11, and 16) are used; the eight passages on the column switching side of the valve (to wit, passages 5, 6, 7, 8, 12, 13, 14, and 15) are not needed, and are not used.

The invention claimed is:

1. In a valve, a valve body having a planar face and having therein a plurality of fluid passages terminating at their inner ends in a generally circular array on said face, the passage terminations being arranged in two separate and independent groups each made up of a plurality of passage terminations, the arcuate distance between adjacent terminations within each single group being less than the arcuate distance between the end termination of one group and the adjacent end termination of the other group; a disc member positioned in engagement with said face and mounted for rotation with respect thereto, said disc member having therein, on the side thereof adjacent said face, a plurality of shallow channels each arranged to couple together a particular pair of passages in a corresponding single one of said groups, the particular pair of passages so coupled together by each channel depending upon the rotational position of said disc with respect to said face; the passage terminations on said face being distributed around the circumferences of two concentric circles centered on the axis of rotation of said disc member with each of said groups including one termination on one of said two circles and also one termination on the other of said two circles, both of said arcuate distances being measured along a single one of said two circles; and means for rotating said disc, with respect to said face, back and forth between a pair of pre-established rotational positions, the angular separation between said pair of positions being such that each channel travels through an arc whose length is less than the second-mentioned arcuate distance, whereby each channel moves within only a corresponding single group of fluid passage terminations as said disc rotates back and forth.

2. Valve structure as defined in claim 1, wherein said channels include one arcuate channel and also one radially-extending channel for each of said groups, the arcuate channel serving to couple together two adjacent passage terminations on the same one of said two circles and the radially-extending channel serving to couple together a passage termination on said one circle and a passage termination on said other circle.

3. Valve structure as defined in claim 1, wherein there are the same total number of terminations on each of said two circles, and wherein both of said arcuate distances are measured along either one of said two circles.

References Cited by the Examiner

UNITED STATES PATENTS

| 1,694,143 | 12/1928 | Roberts | 137—625.19 X |
| 2,911,008 | 11/1959 | Du Bois | 137—625.46 XR |
| 3,085,594 | 4/1963 | Spragens | 137—625.18 |

FOREIGN PATENTS

| 222,945 | 7/1959 | Australia. |
| 122,567 | 4/1931 | Austria. |
| 1,023,939 | 2/1958 | Germany. |

M. CARY NELSON, *Primary Examiner.*

MARTIN P. SCHWADRON, *Examiner.*